United States Patent
Pichl (10) Patent No.: US 10,302,122 B2
(45) Date of Patent: May 28, 2019

(54) BALANCE SHAFT

(71) Applicant: Hirschvogel Umformtechnik GmbH, Denklingen (DE)

(72) Inventor: Markus Pichl, Boebing (DE)

(73) Assignee: Hirschvogel Umformtechnik GmbH, Denklingen (DE)

( * ) Notice: Subject to any disclaimer, the term of this patent is extended or adjusted under 35 U.S.C. 154(b) by 341 days.

(21) Appl. No.: 15/273,823

(22) Filed: Sep. 23, 2016

(65) Prior Publication Data

US 2017/0082173 A1  Mar. 23, 2017

(30) Foreign Application Priority Data

Sep. 23, 2015 (DE) .................. 10 2015 218 277

(51) Int. Cl.
| | |
|---|---|
| *F16C 3/20* | (2006.01) |
| *F16F 15/26* | (2006.01) |
| *F16C 3/18* | (2006.01) |
| *F16C 35/073* | (2006.01) |

(52) U.S. Cl.
CPC .................. *F16C 3/20* (2013.01); *F16C 3/18* (2013.01); *F16C 35/073* (2013.01); *F16F 15/267* (2013.01)

(58) Field of Classification Search
CPC ...... F16C 3/04; F16C 3/18; F16C 3/20; F16C 3/22; F16F 15/264; F16F 15/267
See application file for complete search history.

(56) References Cited

U.S. PATENT DOCUMENTS

| | | | | |
|---|---|---|---|---|
| 4,445,399 | A | * | 5/1984 | Sasaki .................. F16C 3/20 228/214 |
| 5,868,456 | A | * | 2/1999 | Kowalski ............... B60J 5/0444 296/146.6 |
| 8,210,018 | B2 | | 7/2012 | Solfrank et al. |
| 8,375,916 | B2 | | 2/2013 | Tisch |
| 8,393,310 | B2 | | 3/2013 | Tisch |
| 8,413,629 | B2 | | 4/2013 | Herzog et al. |
| 8,413,630 | B2 | | 4/2013 | Herzog et al. |

(Continued)

FOREIGN PATENT DOCUMENTS

| | | |
|---|---|---|
| CN | 101449081 A | 6/2009 |
| CN | 101992256 A | 3/2011 |

(Continued)

OTHER PUBLICATIONS

Reiterer, DE 10 2014 210 030, Jan. 15, 2015, machine translation. (Year: 2015).*

(Continued)

*Primary Examiner* — Hung Q Nguyen
*Assistant Examiner* — Mark L. Greene
(74) *Attorney, Agent, or Firm* — Muncy, Geissler, Olds & Lowe, P.C.

(57) ABSTRACT

A balance shaft for balancing forces of inertia and/or moments of inertia of a reciprocating-piston internal combustion engine, including: at least one elongate main body; at least one bearing seat, disposed on the elongate main body for the mounting of a radial bearing. In the center point of the bearing seat there is provided the rotational axis of the balance shaft. The elongate main body may be formed of an integral tubular element, and the center of mass of the elongate main body may lie outside the rotational axis of the balance shaft.

21 Claims, 10 Drawing Sheets

(56) References Cited

U.S. PATENT DOCUMENTS

| | | | |
|---|---|---|---|
| 8,561,589 B2 | 10/2013 | Trieschmann et al. | |
| 8,757,888 B2* | 6/2014 | Flender | F01L 1/047 384/560 |
| 2011/0024244 A1* | 2/2011 | Roehling | F16D 65/092 188/234 |
| 2013/0283965 A1* | 10/2013 | Schober | F16F 15/268 74/574.2 |
| 2014/0013888 A1 | 1/2014 | Trieschmann et al. | |
| 2014/0261281 A1* | 9/2014 | Jacques | F02B 75/06 123/192.2 |
| 2015/0336163 A1* | 11/2015 | Britzger | B21K 1/08 123/197.1 |

FOREIGN PATENT DOCUMENTS

| | | | |
|---|---|---|---|
| CN | 101994777 A | | 3/2011 |
| CN | 102216481 A | | 10/2011 |
| CN | 102996707 A | * | 3/2013 |
| DE | 3607133 A1 | | 9/1987 |
| DE | 103 47 348 A1 | | 5/2005 |
| DE | 10 2007 009 800 A1 | | 10/2007 |
| DE | 20 2007 018 991 U1 | | 12/2009 |
| DE | 10 2009 036 067 A1 | | 2/2011 |
| DE | 10 2009 036 794 A1 | | 2/2011 |
| DE | 10 2012 216 418 A1 | | 3/2014 |
| DE | 102013207800 A1 | | 10/2014 |
| DE | 102014210030 A1 * | 1/2015 | ............ F16F 15/264 |

OTHER PUBLICATIONS

Zhang, CN 102996707, Mar. 27, 2013, machine translation (Year: 2013).*

Chinese Office Action dated Jun. 25, 2018 in corresponding Chinese application 201610842861.3.

* cited by examiner

BALANCE SHAFT

This nonprovisional application claims priority under 35 U.S.C. § 119(a) to German Patent Application No. 10 2015 218 277.0, which was filed in Germany on Sep. 23, 2015, and which is herein incorporated by reference.

BACKGROUND OF THE INVENTION

Field of the Invention

The present invention relates to a balance shaft for balancing forces of inertia and/or moments of inertia of a reciprocating-piston internal combustion engine and to a method for producing such a balance shaft.

Description of the Background Art

From the prior art, a multiplicity of balance shafts are known. Usually balance shafts are produced by means of a hot forming process, in particular by means of a drop forging process, from a rod-shaped shaft blank.

Balance shafts of this type and production methods for such balance shafts are disclosed, for instance, in printed publications DE 10 2009 036 067 A1 (which corresponds to US 8,210,018), DE 20 2007 018 991 U1 (which corresponds to U.S. Pat. No. 8,413,630) or DE 10 2007 009 800 A1 (which corresponds to U.S. Pat. No. 8,413,629).

For the production of such balance shafts, appropriate tools (for instance drop forging tools) must be provided for the performance of the hot forming process, which tools are comparatively complex and expensive. Furthermore, in particular the use of a drop forging process calls for a comparatively time-consuming and thus cost-intensive remachining of the balance shaft, since corresponding burrs which arise in the drop forging process have to be removed.

SUMMARY OF THE INVENTION

It is therefore an object of the present invention to provide a balance shaft which allows a simplest possible structure and preferably a recourse to standard components. In addition, a method for producing such a balance shaft is provided, which method allows a balance shaft to be produced without the use of a hot forming process, in particular without the use of a drop forging process.

In an exemplary embodiment, a balance shaft is provided for balancing forces of inertia and/or moments of inertia of a reciprocating-piston internal combustion engine that comprises: at least one elongate main body; at least one bearing seat, disposed on the elongate main body, for the mounting of a radial bearing, wherein in the center point of the bearing seat is provided the rotational axis of the balance shaft; wherein the elongate main body is formed of an integral tubular element, and wherein the center of mass of the elongate main body lies outside the rotational axis of the balance shaft.

In other words, in an exemplary embodiment, it is proposed to use as the main body of the balance shaft an integrally configured hollow tube blank. Tube blanks of this type constitute standard components and can thus be easily and cheaply used. Through the use of such standard components, which have already been more or less completed (hardened, ground), in particular the otherwise necessary final machining or final processing (hardening, grinding, finishing) can be dispensed with, so that, in this respect, a considerable cost saving can be achieved. In particular with regard to the otherwise necessary time-consuming and cost-intensive machining of the bearings, considerable cost advantages are achievable by the present invention. Furthermore, through the use of an integral tubular element as the elongate main body, a considerably weight saving can be achieved, to be precise in the order of magnitude of 30% to 40% in comparison to the known forged balance shafts. This weight saving on the elongate main body here has no or no significant effect on the functioning of the balance shaft, since the weight saving is mainly gained by the removal of mass in the rotationally symmetrical regions.

Preferably, the main body can have a substantially triangular or circular cross section. Onto the main body can be arranged, furthermore, "standard" bearing seats (for instance by thermal shrink fitting). In this context, it is preferred to provide a bearing receptacle or a bearing seat respectively by way of a bearing inner ring, onto which a bearing can be clipped. Such a bearing inner ring can comprise, furthermore, two lateral contact regions, which provide appropriate lateral contact surfaces for the bearing. Alternatively, the possibility exists of providing a bearing already complete with a bearing inner ring and of slipping this composite (for instance a "standard" bearing) laterally onto the main body or the bearing seat. In this case, it is preferred that, prior to the slip-on operation, an appropriate contact surface for the bearing (more precisely for the bearing inner ring) is provided on the main body or the bearing seat. The composite of bearing inner ring and bearing can then be slipped onto the main body or bearing seat and brought into engagement with the contact surface. It is here preferred that subsequently a second contact surface is formed on the main body or bearing seat by forming, in particular by a calibration, so that the bearing can be held or received by the two contact surfaces. As a result of the, in the present case, possible use of "standard" bearings, substantially the total cost-intensive and time-consuming refinement steps or final machining steps (hardening, grinding, finishing) with respect to the bearing can here be dispensed with, so that, in this respect, a considerable cost advantage can be achieved.

Preferably, an engagement element, for example, a conical or cylindrical engagement element, is provided on at least one end portion of the balance shaft in order to be able to connect the balance shaft to a drive, in particular a chain wheel drive. Engagement elements of this type are likewise available as standard components.

As a result, a virtually modular structure of a balance shaft according to the invention can thus be provided, which structure leads to high flexibility in the production of different designs of balance shafts and to a considerable cost saving. Moreover, for the production of a balance shaft according to the invention, no relatively cost-intensive and inflexible drop forging process has any longer to be performed, so that, from this aspect too, considerable cost advantages are obtained.

The displacement of the center of mass of the main body can here be realized by the main body being arranged offset from the rotational axis of the balance shaft, and/or by the main body having at least one impression in order to displace the mass, and thus the weight of the main body, with respect to the rotational axis of the balance shaft. Both measures can be used to be able to provide an appropriate unbalance of the balance shaft. Such a stamping process can here be conducted as a cold forming process, wherein in such a process no burring any longer arises, and thus, in a quite particularly preferred manner, an appropriate remachining in comparison to the drop forging process can be avoided.

The impression is here particularly preferredly conducted such that adjacent wall portions are obtained in the region of the at least one impression. In the region of these adjacent wall portions, an additional balancing weight can here be arranged. In particular, such a balancing weight can particularly advantageously be clamped between the adjacent wall portions. As a result of such a structure, the possibility exists of being able to conduct in one production step both the at least one impression and the arrangement of an additional balancing weight.

Furthermore, it can be of advantage to arrange on the outer periphery of the elongate main body at least one further balancing weight in order to once again easily increase, as far as necessary, the unbalance of the balance shaft. In an example, the at least one additional balancing weight arranged on the outer periphery does not have to be configured integrally with the elongate main body, but rather is bonded, welded and/or soldered to the elongate main body.

The additional balancing weight can be produced from a heavy metal or a heavy metal alloy, for example, from a metal alloy with high tungsten content, wherein the tungsten content is preferredly above 90%, and wherein the metal alloy has particularly preferredly a density between 17.0 and 19.0 g/cm$^3$. By virtue of example, DENSIMET® of Plansee should here be cited.

In addition, it is of advantage if the elongate main body has different material densities and/or different wall thicknesses. For example, the elongate main body can have different wall thicknesses along its longitudinal extent. As a result, the possibility in turn exists of adapting the unbalance of the balance shaft or of increasing it still further.

The elongate main body may be produced from a metal alloy.

The at least one bearing seat can be for a roller bearing or can be configured as a part of a (roller) bearing, in particular as a bearing inner ring. Thus further costs can be saved through the use of standard parts.

The present invention further relates to a method for producing a balance shaft, comprising at least the following steps: provision of at least one elongate main body, which is formed of an integral tubular element; arrangement of at least one bearing seat for the mounting of a radial bearing, wherein in the center point of the bearing seat is provided the rotational axis of the balance shaft, and wherein the center of mass of the elongate main body lies outside the rotational axis of the balance shaft.

As a result, a balance shaft which can be produced with substantially lower costs and which additionally has a substantially lower weight in comparison to the known forged balance shafts can thus be provided by the present invention, so that, through the use of a balance shaft according to the invention, also the fuel consumption can be reduced correspondingly.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1A:
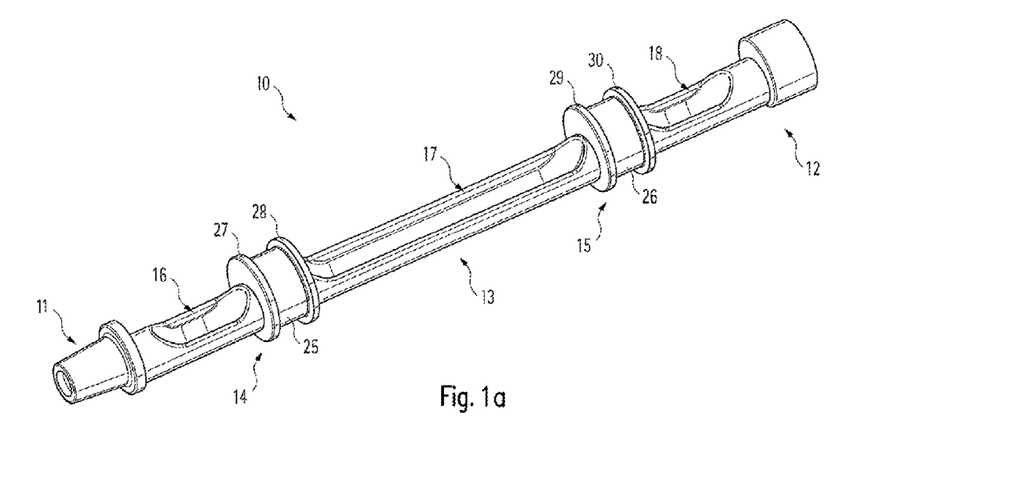
FIG. 1a shows a schematic view of an embodiment of a balance shaft according to the invention.

FIG. 1 a shows an embodiment of a balance shaft 10 according to the invention. The balance shaft 10 comprises on opposite end portions two engagement elements 11, 12, with which the balance shaft 10 is connectable to a drive, in particular a chain drive, and which are arranged on an integrally configured tubular main body 13. In addition, the balance shaft 10 comprises two bearing seats 14, 15 for the mounting of a radial bearing. In the center point of the bearing seats 14, 15 lies the rotational axis of the balance shaft 10. In particular through the use of a tubular main body 13, a considerable weight saving can here be achieved, to be precise in the order of magnitude of 30% to 40% in comparison to the known forged balance shafts. This weight saving here has no or no significant effect on the functioning of the balance shaft 10, since the weight saving is mainly gained by the removal of virtually surplus mass in the rotationally symmetrical regions of the balance shaft 10.

As can clearly be seen in FIG. 1a, the tubular main body 13 has three impressions 16, 17, 18. The impressions 16, 17, 18 have here been made in the tubular main body 13 by a cold forming process (preferably a stamping process). Thus the possibility exists of producing a balance shaft 10 according to the invention without a hot forming process, in particular no otherwise customary drop forging process, necessarily having to be used. As already stated above, the use of a cold forming process constitutes a particularly preferred production process for a balance shaft 10 according to the invention, since such a forming process can be conducted free from burrs. With this kind of particularly preferred method for producing a balance shaft 10 according to the invention, the possibility thus exists of saving the, in practice, relatively time-consuming and thus cost-intensive step of deburring and remachining.

In addition, the possibility exists of assembling a balance shaft 10 according to the invention virtually from standard components. Here, only the bearing seats 14, 15 and the engagement portions 11, 12 have to be arranged on the previously appropriately stamped tubular main body 13 in order to obtain a balance shaft 10 according to the invention. This virtually modular structure of a balance shaft 10 according to the invention leads to high flexibility in the production of different designs of balance shafts and to a considerable cost saving, since recourse can be made to standard components. Moreover, for the production of a balance shaft 10 according to the invention, no relatively cost-intensive and inflexible drop forging process has any longer to be performed. In the shown first embodiment, the bearing seats 14, 15 are arranged in regions of the balance shaft 10 at which this (more precisely the tubular main body 13) has not been deformed by the impressions 16, 17, 18. In other words, the bearing seats 14, 15 are preferably arranged between the impressions 16, 17, 18 on the balance shaft 10 (or on the tubular main body 13).

As can clearly be seen in FIG. 1a, in this preferred embodiment, the bearing seats 14, 15 respectively comprise a bearing receiving ring 25, 26, onto which the bearings (not shown) can subsequently be clipped. A bearing receiving ring 25, 26 here preferably respectively comprises two contact regions 27, 28, 29, 30, which, in the direction parallel to the rotational axis of the balance shaft 10, provides (lateral) contact surfaces for the bearings.

It is also conceivable, for instance, to provide "standard" bearings on the shown bearing seats 14, 15, in that they are slipped laterally onto the bearing seats 14, 15. Prior to the slip-on action, on the bearing seat a corresponding contact surface (such as, for instance, contact regions 28, 29) is respectively provided for the bearing. The bearing can then be slipped laterally onto the bearing seat 14, 15 and brought into engagement with the contact surface. Following this, a second contact region 27, 30 is formed by a forming process, in particular by a calibration (calibration stroke), on the bearing seat 14, 15, so that the bearing is held or received by the two contact regions or shoulders. Precisely through the use of "standard" bearings, considerable cost advantages can be achieved by the present invention, since the cost-intensive and time-consuming refinement or final machining steps (hardening, grinding, finishing) with respect to the bearing can be dispensed with.

Figure 1B:
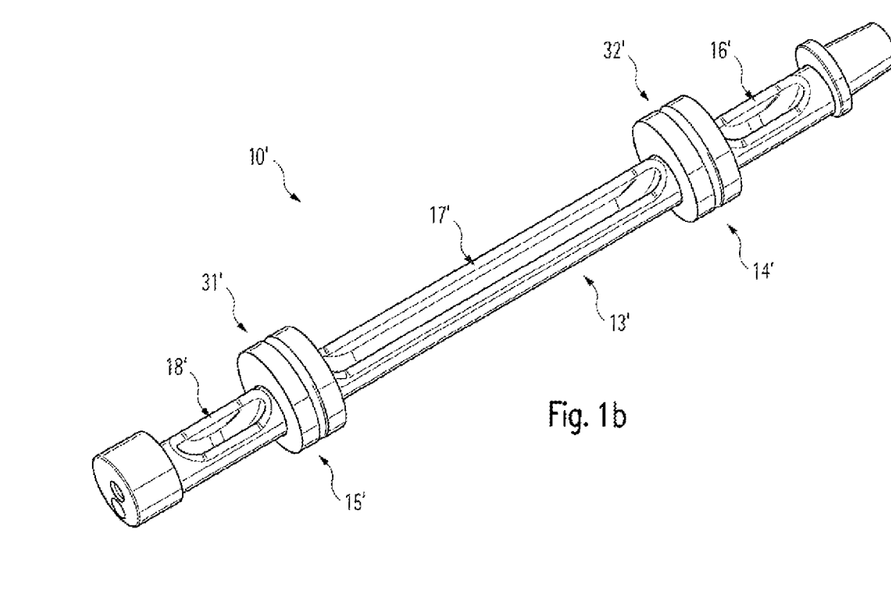
FIG. 1b shows a schematic view of the embodiment of a balance shaft according to the invention with (part of a) roller bearing.

FIG. 1b shows an embodiment of a balance shaft 10' in an alternative having two roller bearings. According to this illustrative embodiment, the bearing seat 14', 15' at the same time forms a bearing inner ring 31', 32' for a corresponding bearing. For the rest, the shown embodiment corresponds to that embodiment of the balance shaft 10 which is shown in FIG. 1a, so that, with respect to the further details, reference is made to the above.

Figure 2A:
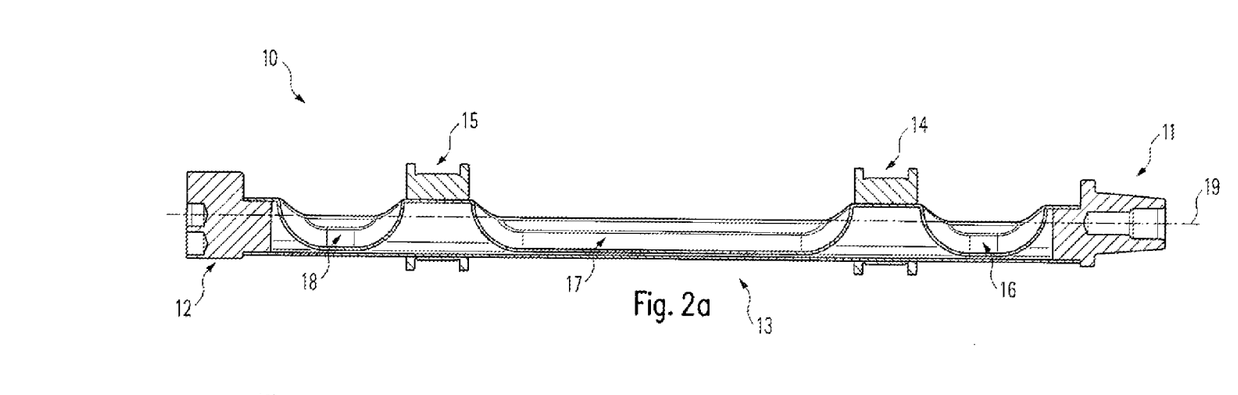
FIG. 2a shows a schematic sectional view of the balance shaft from FIG. 1a along the rotational axis of the balance shaft.

FIG. 2a shows a schematic sectional view of the balance shaft 10 from FIG. 1a along the rotational axis 19 of the balance shaft 10. Identical parts are provided with identical reference symbols.

As can clearly be seen in FIG. 2a, as a result of the impressions 16, 17, 18 an asymmetrical mass and weight distribution with respect to the rotational axis 19 of the balance shaft 10 is obtained. As can likewise clearly be seen in FIG. 2a, the tubular main body 13 is arranged, furthermore, offset from the rotational axis 19 of the balance shaft 10, in order to shift the center of mass of the tubular main body 13 still further from the rotational axis 19 of the balance shaft 10. Thus, in the first preferred embodiment, an unbalance (i.e. a shift of the center of mass of the main body 13 relative to the rotational axis 19 of the balance shaft 10) is achieved, on the one hand by virtue of the impressions 16, 17, 18 (i.e. by the displacement of the mass from one side to the opposite side of the main body 13) and on the other hand by the offset arrangement of the main body 13 with respect to the rotational axis 19 of the balance shaft 10.

Figure 2B:
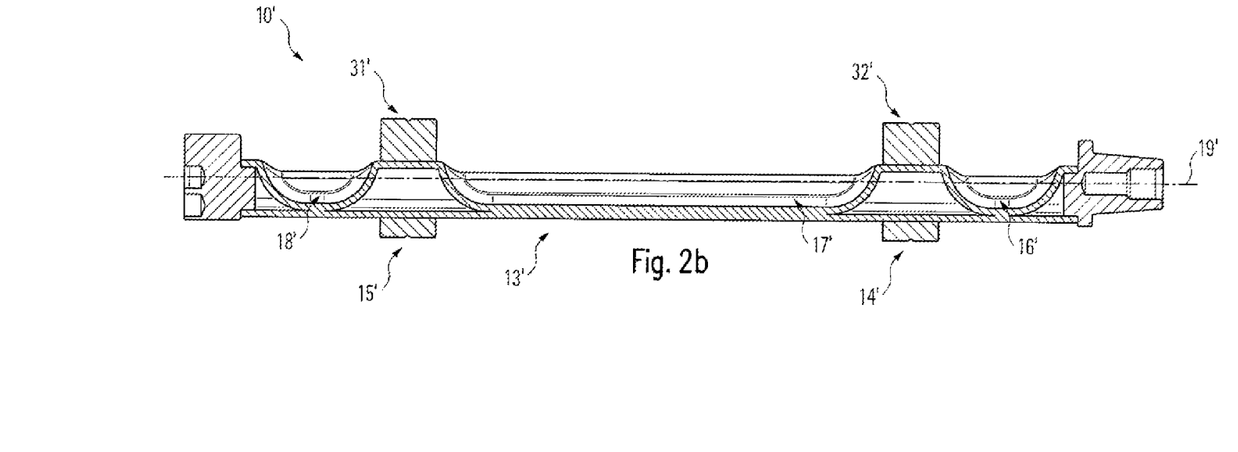
FIG. 2b shows a schematic sectional view of the balance shaft from FIG. 1b along the rotational axis of the balance shaft.

FIG. 2b shows a representation, corresponding to FIG. 2a, of the balance shaft 10' from FIG. 1b, so that, with respect to the further details, reference is in turn made to the above.

Figure 3:
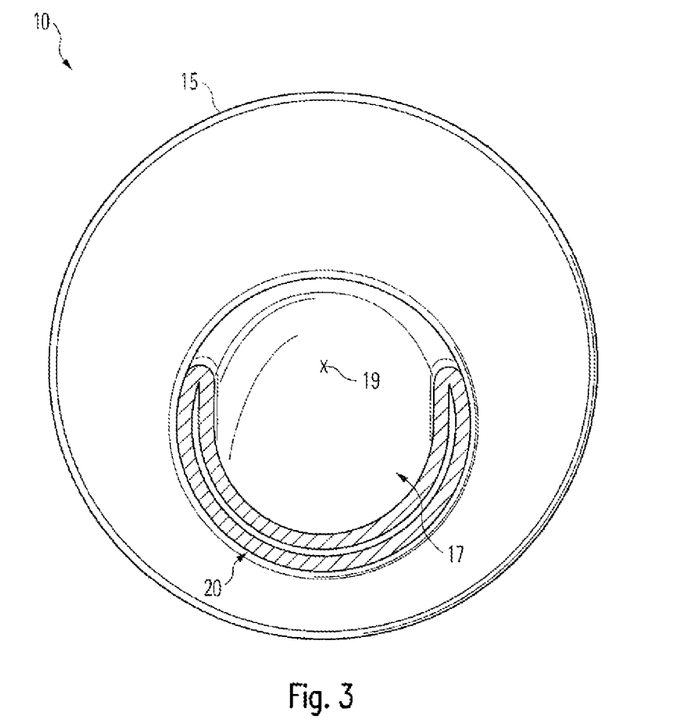
FIG. 3 shows a schematic sectional view of the balance shaft from FIG. 1a perpendicular to the rotational axis of the balance shaft.

FIG. 3 shows a schematic sectional view of the balance shaft 10 from FIG. 1a perpendicular to the rotational axis 19 of the balance shaft 10. Identical parts are in turn provided with identical reference symbols.

As can clearly be seen in FIG. 3, the material of the tubular main body 13 is displaced in the region 20 of the impressions 16, 17, 18 in such a way onto one side of the main body 13 that the wall portions of the main body 13 are arranged adjacent to one another. Optionally, an additional balancing weight (not shown) can be arranged in this region 20 or be clamped by the wall portions in the main body 13.

Figure 4A:
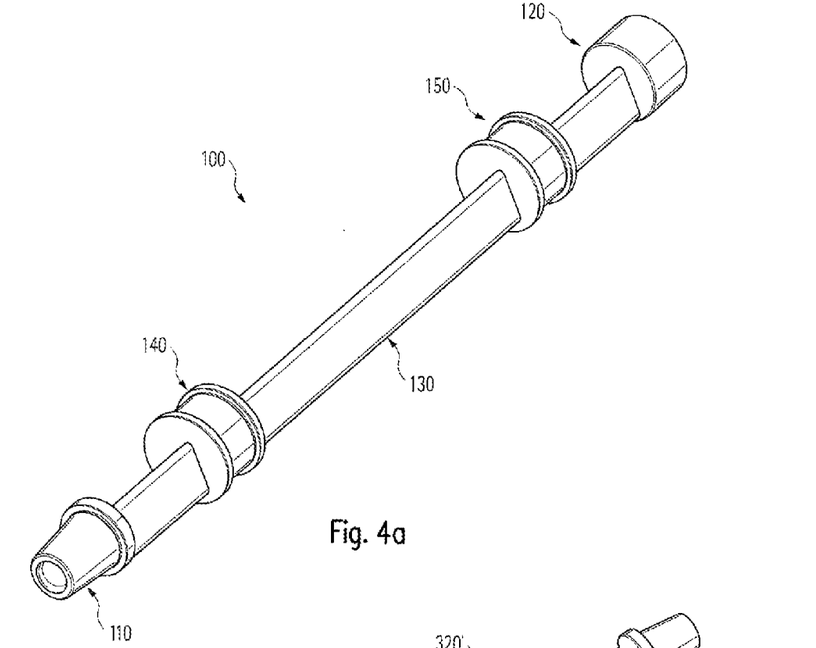
FIG. 4a shows a schematic view of an embodiment of a balance shaft according to the invention of the balance shaft.

FIG. 4a shows a schematic view of a second embodiment of a balance shaft 100 according to the invention. The balance shaft 100 in turn comprises on opposite end portions two engagement elements 110, 120, with which the balance shaft 100 is connectable to a drive, in particular a chain drive, and which are arranged on an integrally configured main body 130. In addition, the balance shaft 100 likewise comprises two bearing seats 140, 150 for the mounting of a radial bearing. In the center point of the bearing seats 140, 150 lies the rotational axis 190 of the balance shaft 100.

Figure 4B:
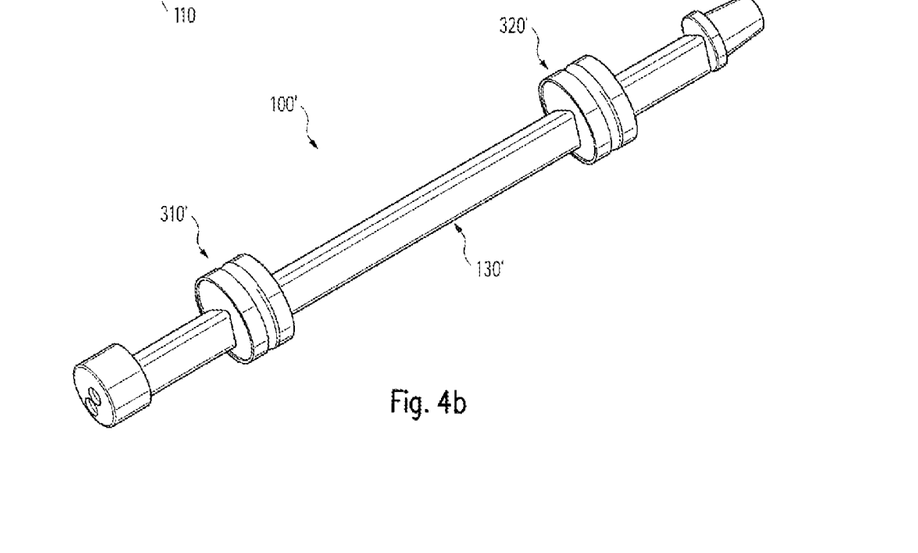
FIG. 4b shows a schematic view of the embodiment of a balance shaft according to the invention with (part of a) roller bearing.

Unlike the first illustrative embodiment, the main body 130 has a substantially triangular cross section, to be precise over the entire longitudinal extent of the main body 130 (i.e. the main body 130 of the second preferred embodiment has no impressions 16, 17, 18). FIG. 4b shows a balance shaft 100' in the second embodiment in an alternative having two roller bearings, in which alternative the bearing seats 140', 150' at the same time form a bearing inner ring 310', 320' for a corresponding bearing.

Figure 5A:
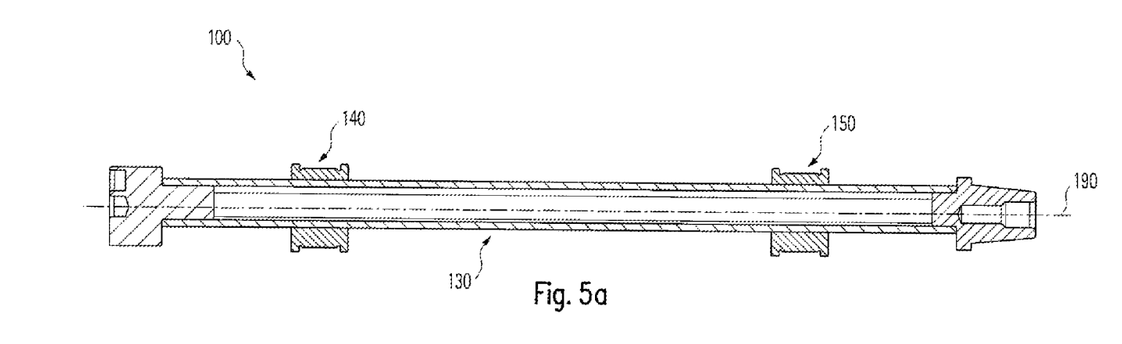
FIG. 5a shows a schematic sectional view of the balance shaft from FIG. 4a along the rotational axis of the balance shaft.
Figure 5B:
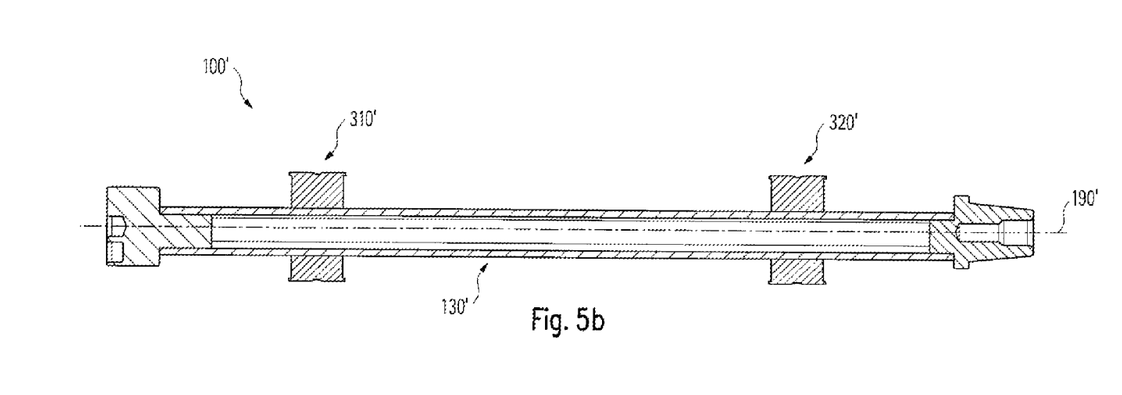
FIG. 5b shows a schematic sectional view of the balance shaft from FIG. 4b along the rotational axis of the balance shaft.
Figure 6:
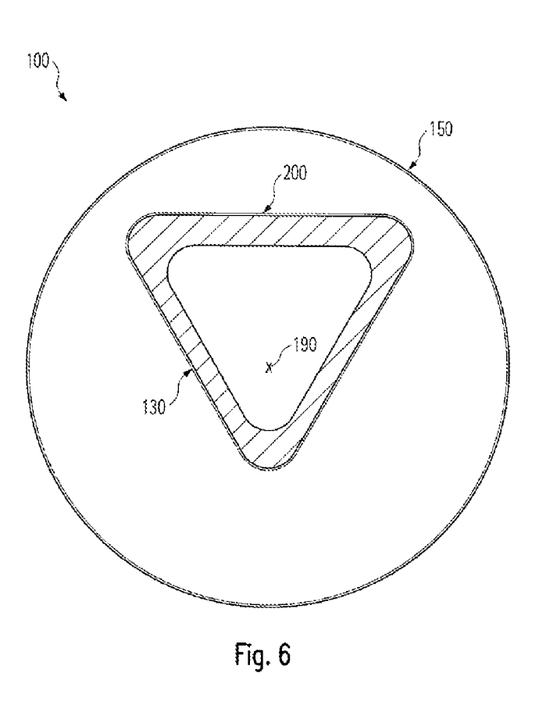
FIG. 6 shows a schematic sectional view of the balance shaft from FIG. 4a perpendicular to the rotational axis of the balance shaft.

FIG. 5a shows a schematic sectional view of the balance shaft 100 from FIG. 4a along the rotational axis 190 of the balance shaft 100. Identical parts are provided with identical reference symbols. As can clearly be seen in FIG. 5a, the main body 130 is in turn offset from the rotational axis 190 of the balance shaft 100, so that, already as a result thereof, an appropriate unbalance is obtained. As can clearly be seen in FIG. 6, for the enlargement of the unbalance, moreover, one side 200 of the cross-sectionally triangular main body 130 is configured with a greater or with different wall thicknesses. FIG. 5b shows a representation, corresponding to FIG. 5a, of the balance shaft 100' from FIG. 4b.

Figure 7:
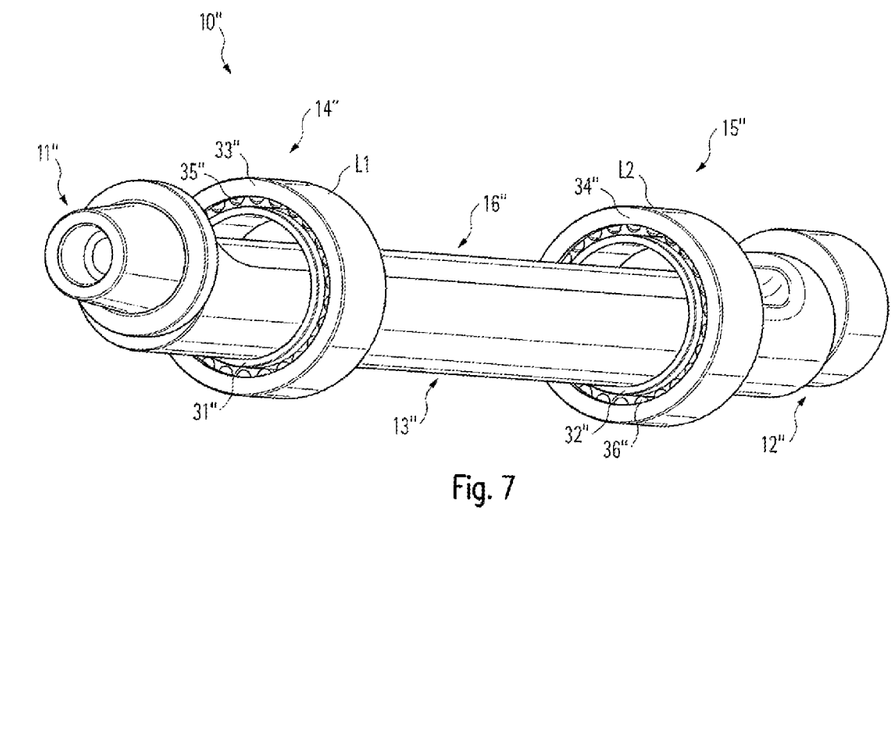
FIG. 7 shows a schematic view of an embodiment of a balance shaft according to the invention.
Figure 8:
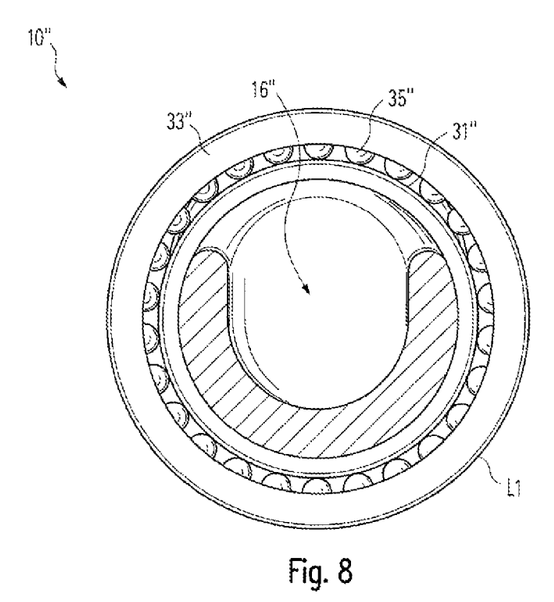
FIG. 8 shows a schematic cross-sectional view of the balance shaft from FIG. 7 along the rotational axis of the balance shaft.
Figure 9:
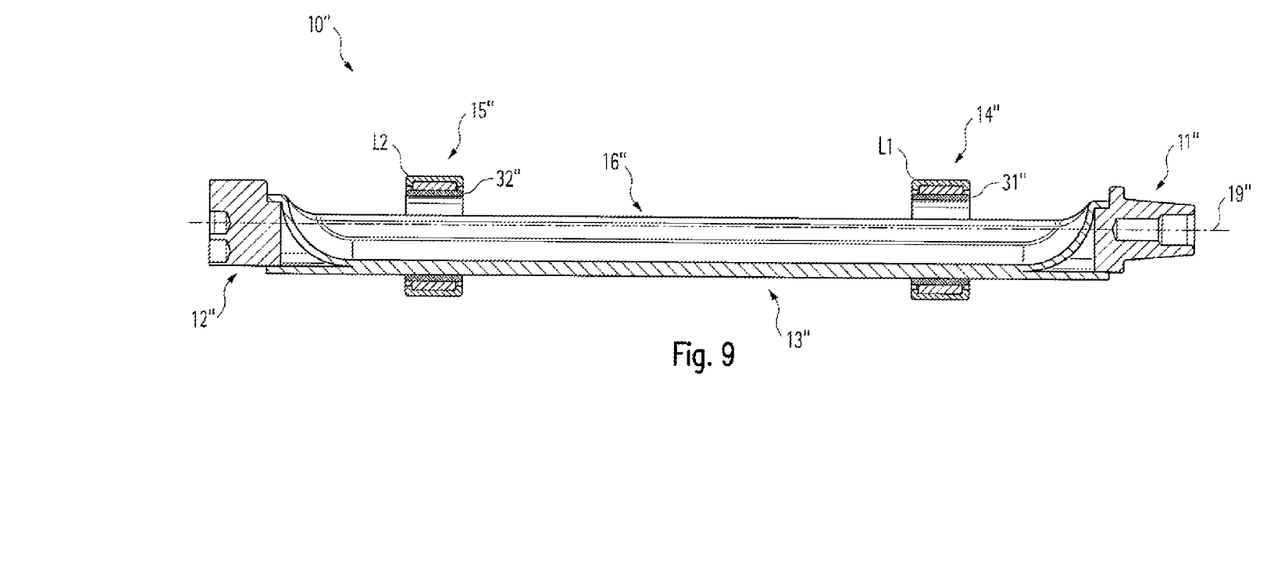
FIG. 9 shows a schematic sectional view of the balance shaft from FIG. 7 perpendicular to the rotational axis of the balance shaft.

FIGS. 7 to 9 show a schematic view of a third embodiment of a balance shaft 10" according to the invention.

Here, the balance shaft 10" shown in FIGS. 7 to 9 has no three separate impressions 16, 17, 18 (cf. FIGS. 1), but only one continuous impression 16". The impression 16" here extends substantially over the entire length of the balance shaft 10", i.e. substantially in the entire region between the opposite engagement elements 11″ and 12″ and, in particular, also in the region of the bearing seats 14″, 15″.

In the shown embodiment of the balance shaft 10″, the bearings L1, L2 are provided already complete with a bearing inner ring 31″, 32″ (for instance in the form of a "standard" bearing) and slipped, as a kind of composite, in each case laterally onto the bearing seat 14″, 15″. In this case, it is preferred that, prior to the slip-on operation, an appropriate contact surface is respectively provided for the bearing L1, L2 (more precisely for the bearing inner ring 31″, 32″) on the tubular main body 13″. The composite of bearing outer ring 33″, 34″, rolling element 35″, 36″ and bearing inner ring 31″, 32″—thus in general terms the bearing L1, L2—can then respectively be slipped onto the main body 13″ and be brought into engagement with the contact surface. Preferably, a second contact region is subsequently formed on the main body 13″ by a forming process, in particular by a calibration (i.e. through a so-called calibration stroke), so that the bearing inner rings 31″, 32″, and thus the bearings L1, L2, can be held or received by the two contact regions (cf. FIG. 8).

The present invention is not limited to the preceding illustrative embodiments, as long as it is embraced by the subject of the following claims. Furthermore, the preceding illustrative embodiments are mutually combinable and intercombinable in any chosen manner. In particular, those alternative designs of the bearings which are shown in the first and third embodiment can be intercombined in any chosen manner on a balance shaft. The shifting of the center of mass of the main body with respect to the rotational axis of the balance shaft can further be realized by a displacement of the mass of the main body and/or by an offset arrangement of the main body with respect to the rotational axis of the balance shaft. Various additional balancing weights can also be provided in the main body (preferably arranged or clamped in the region of the impressions 16, 17, 18), and/or various additional balancing weights can be arranged on the outer periphery of the balance shaft. Finally, it should be pointed out that the respective masses or the bearing seats of the balance shaft can be adapted, with respect to their arrangement in the direction of the rotational axis, to the respectively specific installation environment. The bearings and attachment parts can be fitted moreover, apart from by the described processes, also by thermal shrink fit or alternative joining methods. By "identical reference symbols" is understood within the scope of the invention only the appropriate numeral, irrespective of the hyphens for differentiation of the embodiments.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A balance shaft for balancing forces of inertia and/or moments of inertia of a reciprocating-piston internal combustion engine, the balance shaft comprising:
    at least one elongate main body;
    at least one bearing seat disposed on the at least one elongate main body for the mounting of a radial bearing,
    wherein in a center point of the at least one bearing seat is provided a rotational axis of the balance shaft,
    wherein the at least one elongate main body is formed of an integral tubular element,
    wherein a center of mass of the at least one elongate main body lies outside of the rotational axis of the balance shaft, and
    wherein either:
    the at least one elongate main body has at least one impression, wherein the material of the at least one elongate main body is displaced in a region of the at least one impression onto one side of the at least one elongate body so that the at least one elongate main body has adjacent wall portions in the region of the at least one impression to provide an unbalance of the balance shaft, wherein between the adjacent wall portions, in the region of the at least one impression, at least one balancing weight is arranged or is clamped between the adjacent wall portions; or
    the at least one elongate main body has a substantially triangular cross-section which is configured with different wall thicknesses.

2. The balance shaft according to claim 1, wherein the at least one elongate main body is arranged offset from the rotational axis of the balance shaft.

3. The balance shaft according to claim 1, wherein the at least one impression is provided by a cold forming process.

4. The balance shaft according to claim 1, wherein the at least one additional balancing weight is produced from a heavy metal being a tungsten alloy, and wherein the tungsten content in the tungsten alloy is above 90%, and wherein the tungsten alloy has a density between 17.0 and 19.0 g/cm³.

5. The balance shaft according to claim 1, wherein at least one additional balancing weight is arranged on an outer periphery of the at least one elongate main body.

6. The balance shaft according to claim 5, wherein the at least one additional balancing weight arranged on the outer periphery is not configured integrally with the at least one elongate main body, but is bonded, welded and/or soldered to the at least one elongate main body.

7. The balance shaft according to claim 1, wherein the at least one elongate main body has different material densities.

8. The balance shaft according to claim 1, wherein the at least one elongate main body has different wall thicknesses along a longitudinal extent thereof.

9. The balance shaft according to claim 8, wherein the at least one bearing seat is thermally shrunk onto the at least one elongate main body.

10. The balance shaft according to claim 1, wherein the at least one bearing seat is not configured integrally with the at least one elongate main body.

11. The balance shaft according to claim 1, wherein the at least one elongate main body is produced from a metal alloy.

12. The balance shaft according to claim 1, wherein the at least one bearing seat is for a roller bearing or is configured as a part of a roller bearing or as a bearing inner ring.

13. The balance shaft according to claim 1, wherein the balance shaft has on at least one end portion an engagement element, which is configured such that the balance shaft is connectable to a drive or a chain drive.

14. A method for producing a balance shaft according to claim 1, the method comprising:
    providing at least one elongate main body, which is formed of an integral tubular element;
    arranging at least one bearing seat for the mounting of a radial bearing, wherein in a center point of the at least one bearing seat is provided a rotational axis of the balance shaft, and wherein a center of mass of the at least one elongate main body lies outside of the rotational axis of the balance shaft,
    wherein either:
    at least one impression is made on the at least one elongate main body, wherein the material of the at least one elongate main body is displaced in a region of the at least one impression onto one side of the at least one elongate main body such that adjacent wall portions are formed in the region of the at least one impression to provide an unbalance of the balance shaft, wherein in a region of the adjacent wall portions, at least one balancing weight is arranged or is clamped between the adjacent wall portions; or the at least one elongate main body has a substantially triangular cross-section which is configured with different wall thicknesses.

15. The method according to claim 14, wherein the at least one elongate main body is arranged offset from the rotational axis of the balance shaft.

16. The method according to claim 14, wherein the at least one impression is made in the at least one elongate main body by a cold forming process.

17. The method according to claim 16, wherein the cold forming process comprises a stamping step.

18. The method according to claim 14, wherein at least one additional balancing weight is arranged on an outer periphery of the at least one elongate main body.

19. The method according to claim 18, wherein the at least one additional balancing weight arranged on the outer periphery is not configured integrally with the at least one elongate main body and is bonded, welded and/or soldered to the at least one elongate main body.

20. The method according to claim 14, wherein the at least one bearing seat is not configured integrally with the at least one elongate main body.

21. The method according to claim 20, wherein the at least one bearing seat is thermally shrunk onto the at least one elongate main body.

* * * * *